(12) United States Patent
Cheng

(10) Patent No.: US 8,054,406 B2
(45) Date of Patent: Nov. 8, 2011

(54) BACKLIGHT MODULE WITH HEAT DISPERSING MEMBER AND LIQUID CRYSTAL DISPLAY DEVICE USING SAME

(75) Inventor: Wei-Jung Cheng, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 582 days.

(21) Appl. No.: 12/156,619

(22) Filed: Jun. 2, 2008

(65) Prior Publication Data

US 2008/0297688 A1    Dec. 4, 2008

(30) Foreign Application Priority Data

Jun. 1, 2007   (CN) .................. 2007 2 0120478 U

(51) Int. Cl.
   *G02F 1/1335*   (2006.01)
(52) U.S. Cl. ............................. 349/65; 349/61; 362/294

(58) Field of Classification Search ................. 349/58, 349/61, 65; 362/633, 294
See application file for complete search history.

(56) References Cited

U.S. PATENT DOCUMENTS

| | | | |
|---|---|---|---|
| 6,976,781 B2 * | 12/2005 | Chu et al. ...................... | 362/633 |
| 2002/0113534 A1 * | 8/2002 | Hayashi et al. ............... | 313/113 |
| 2007/0047265 A1 * | 3/2007 | Kang et al. .................... | 362/634 |

* cited by examiner

*Primary Examiner* — David Nelms
*Assistant Examiner* — Nathanael R Briggs
(74) *Attorney, Agent, or Firm* — Altis Law Group, Inc.

(57) ABSTRACT

An exemplary backlight module (200) used for liquid crystal display device (20) includes a first frame (261), a light source (240), a heat dispersing member (280) disposed along the light source, and a second frame (270) defining a window at a middle portion thereof. The second frame cooperative with the first frame to form a space receiving the light source and the heat dispersing member therein.

20 Claims, 2 Drawing Sheets

BACKLIGHT MODULE WITH HEAT DISPERSING MEMBER AND LIQUID CRYSTAL DISPLAY DEVICE USING SAME

CROSS-REFERENCE TO RELATED APPLICATION

This application is related to, and claims the benefit of, a foreign priority application filed in China as Serial No. 200720120478.3 on Jun. 1, 2007. The related application is incorporated herein by reference.

FIELD OF THE INVENTION

The present invention relates to backlight modules typically used for liquid crystal display devices; and more particularly to a backlight module having a hollow bottom tray, and a liquid crystal display device incorporating the backlight module.

GENERAL BACKGROUND

Recently, liquid crystal display devices have been in widespread use as display devices for compact electronic apparatuses. Typical liquid crystal display devices not only provide good quality images with little power consumption, but also are very thin. The liquid crystal in a liquid crystal display device does not emit any light itself. The liquid crystal has to be lighted by a light source so as to clearly and sharply display text and images. Thus, a backlight module is generally needed for a liquid crystal display device.

Generally, a liquid crystal display device includes a top bezel, a plastic frame, and a bottom tray, whereby the top bezel, the plastic frame, and the bottom tray cooperatively form a space for receiving a liquid crystal panel and a backlight module. The bottom tray is made of alloy or metallic material with good heat transmission characteristics and high mechanical strength.

However, the alloy or metallic material of the bottom tray makes the backlight module and the liquid crystal display device incorporating the backlight module somewhat costly and heavy.

What is needed, therefore, is a backlight module and a liquid crystal display device incorporating the backlight module which can overcome the above-described deficiencies.

SUMMARY

In an exemplary embodiment, a backlight module includes a first frame, a light source, a heat dispersing member disposed along the light source, and a second frame defining a window at a middle portion thereof. The second frame cooperative with the first frame to form a space receiving the light source and the heat dispersing member therein.

In another exemplary embodiment, a liquid crystal display device includes a liquid crystal panel and a backlight module for illuminating the liquid crystal panel. The backlight module includes a frame, a light source comprising a lamp, a strip-shaped heat dispersing member positioned adjacent to the light source and corresponding to a length of the lamp, and a hollow tray. The hollow tray cooperates with the frame to form a space accommodating the light source and the heat dispersing member.

Other aspects, novel features and advantages will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF PREFERRED EMBODIMENTS

Reference will now be made to the drawings to describe preferred and exemplary embodiments of the present invention in detail.

Figure 1:
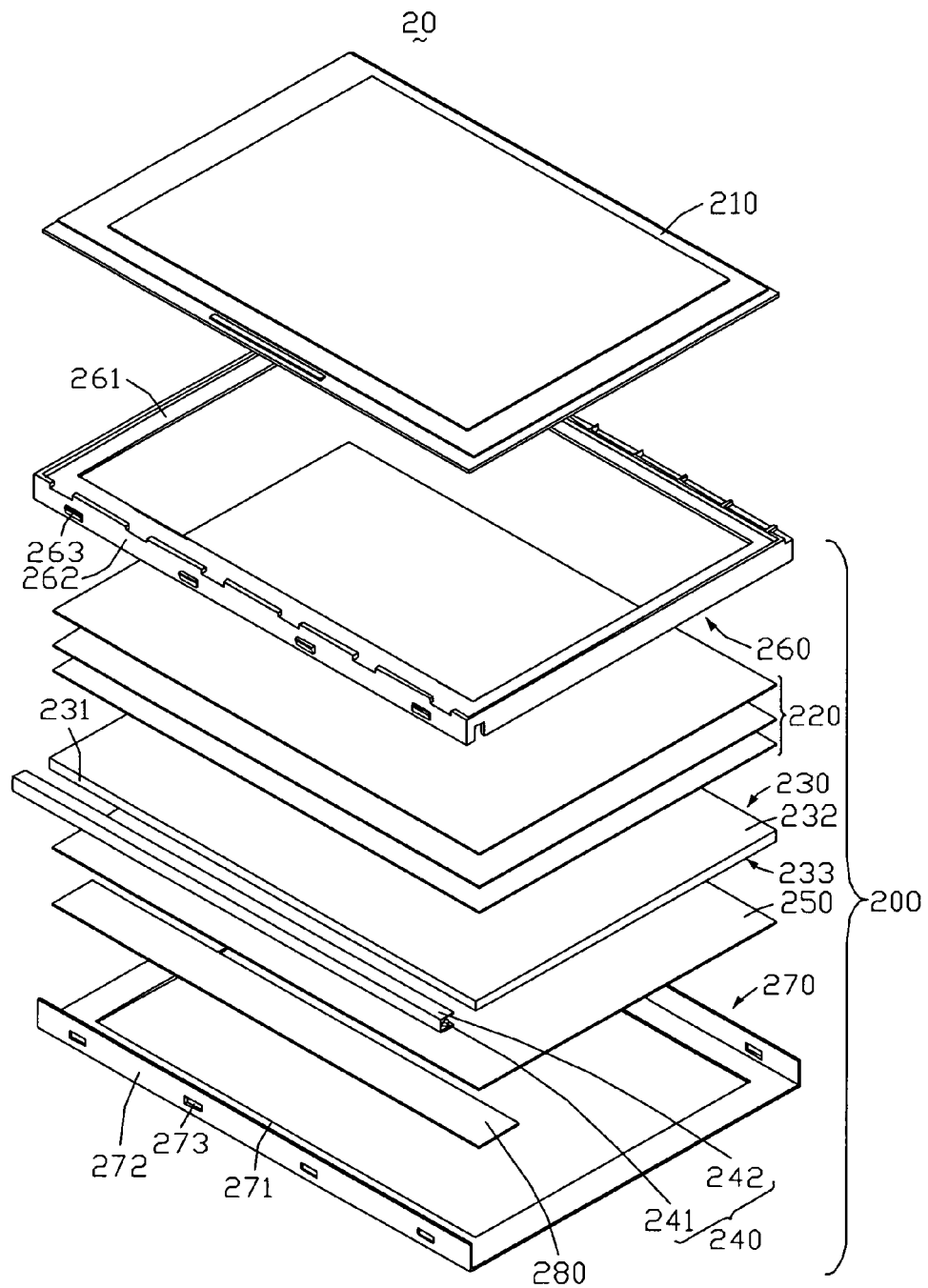
FIG. 1 is an exploded, isometric view of a liquid crystal display device according to an exemplary embodiment of the present invention.

Referring to FIG. 1, an exploded, isometric view of a liquid crystal display device according to an exemplary embodiment of the present invention is shown. The liquid crystal display device 20 includes a liquid crystal panel 210 and a backlight module 200. The backlight module 200 is disposed under the liquid crystal panel 210 for illuminating the liquid crystal panel 210.

The backlight module 200 includes a set of optical films 220, a light guide plate 230, a light source 240, a reflective sheet 250, a plastic frame 260, a bottom tray 270, and a heat dispersing plate 280. The plastic frame 260 cooperates with the bottom tray 270 to form a space for receiving the set of optical films 220, the light guide plate 230, the light source 240, the reflective sheet 250, and the heat dispersing plate 280.

The light guide plate 230 includes a top light input surface 231, a light output surface 232 adjacent to the light input surface 231, and a bottom surface 233. The light source 240 includes a lamp 241, and a reflective cover 242 receiving the lamp 241. The reflective cover 242 includes a strip-shaped opening corresponding to the light input surface 231. The lamp 241 may be a cold cathode fluorescent lamp.

The plastic frame 260 has a generally rectangular shape with a window at a middle portion thereof, and has four side portions 261, four side walls 262, and a plurality of catches 263 disposed at the side walls 262. Each of the side walls 262 extends from one corresponding side portion 261. The catches 263 are respectively disposed at outer surfaces of two opposite of the side walls 262.

The bottom tray 270 also has a generally rectangular shape with a window at a middle portion thereof. The bottom tray 270 may be made of plastic material, a like material, or another suitable material. The bottom tray 270 includes a hollow bottom frame 271, two side plates 272 upwardly extending from two opposite sides of the bottom frame 271, and a plurality of catch holes 273 respectively disposed at outer surfaces of the side plates 272. The catch holes 273 corresponding to the catches 263.

The heat dispersing plate 280 is a thin plate with a rectangular shape, and may be made of aluminum material. The heat dispersing plate 280 has a length equal to that of the lamp 241, and has a width larger than that of the reflective cover 242. The width of the heat dispersing plate 280 may be equal to or larger than a quarter of a corresponding width of the bottom tray 270. The heat dispersing plate 280 is capable of dispersing heat generated by the lamp 241 quickly, so as to keep the temperature of the lamp 241 within an acceptable range.

Figure 2:
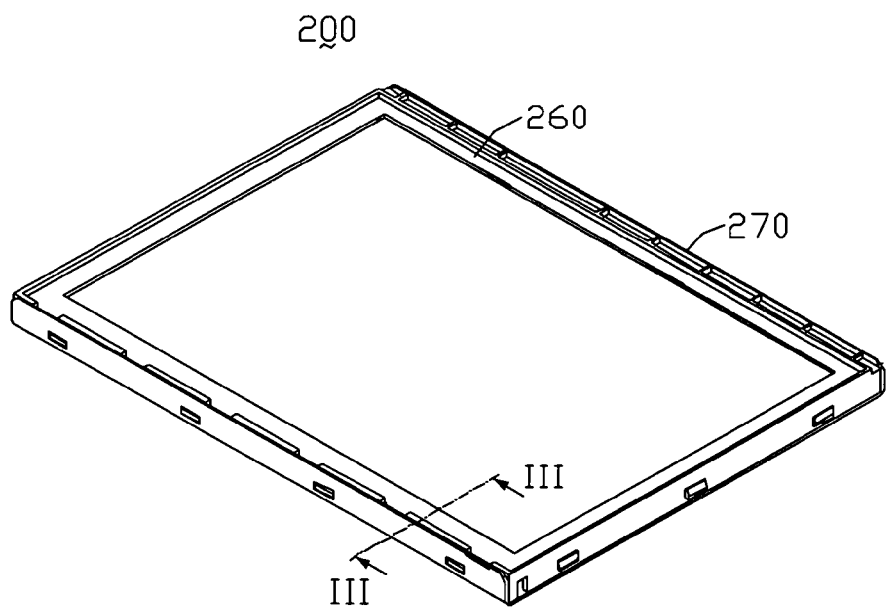
FIG. 2 is an assembled view of a backlight module of the liquid crystal display device of FIG. 1
Figure 3:
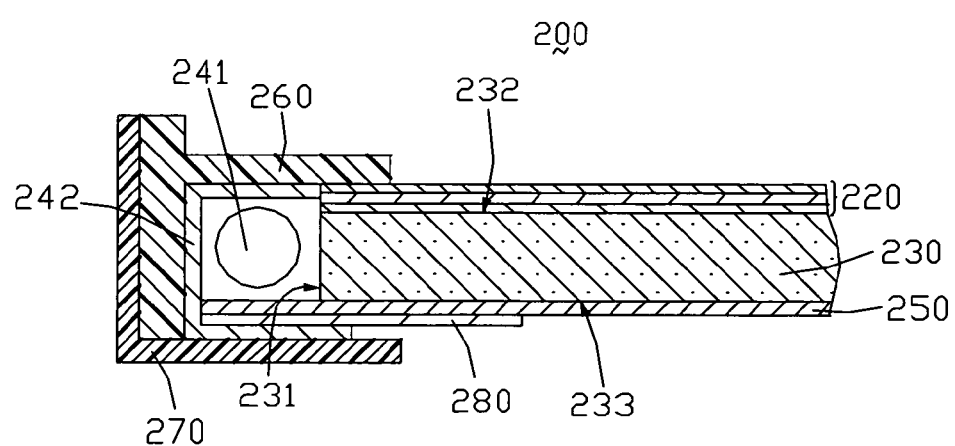
FIG. 3 is an enlarged, cross-sectional view taken along line III-III of FIG. 2.

Also referring to FIGS. 2-3, in assembly of the liquid crystal display device 20, the lamp 241 is received in the reflective cover 242, and the reflective cover 242 is received in the bottom tray 270. The opening of the reflective cover 242 is located at a lateral innermost side of the bottom tray 270. The reflective sheet 250 is disposed on the bottom frame 271, and one side portion of the reflective sheet 250 is received in the reflective cover 242. The heat dispersing plate 280 is disposed between the reflective cover 242 and the reflective plate 250. The heat dispersing plate 280 is attached to the reflective cover 242 so as to quickly disperse heat generated by the lamp 241. The light guide plate 230 is disposed on the reflective sheet 250, with the light input surface 231 located adjacent to the lamp 241. The set of optical films 220 is disposed on the light output surface 232 of the light guide plate 230. Each of the catches 263 of the plastic frame 260 engages in a corresponding one of the catch holes 273 of the bottom tray 270, so as to tightly attach the plastic frame 260 and the bottom tray 270 together. Thereby, the plastic frame 260 and the bottom tray 270 cooperatively form a space accommodating the set of optical films 220, the light guide plate 230, the light source 240, the reflective sheet 250, and the heat dispersing plate 280.

Unlike with a conventional backlight module, the bottom tray 270 defines a hollow portion. Thus the amount of material needed to fabricate the bottom tray 270 is reduced, and the cost of the bottom tray 270 is correspondingly low. In addition, when the bottom tray 270 is made of plastic material, the bottom tray 270 is correspondingly lightweight. Furthermore, the heat dispersing plate 280 is attached to the reflective cover 242 of the light source 240, and can substitute for the bottom plate of a conventional bottom tray. Moreover, the heat dispersing plate 280 can quickly disperse heat generated by the lamp 241.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module, comprising:
    a first frame defining a first window at a middle portion thereof;
    a light guide plate comprising a light input surface;
    a light source comprising a lamp and a reflective cover receiving the lamp, the reflective cover comprising two opposite side walls and another side wall connecting the two opposite side walls, the three side walls cooperatively defining a first receiving space with an opening facing the light input surface of the light guide plate, the lamp being received in the first receiving space, and light emitted from the lamp transmitted to the light input surface of the light guide plate via the opening of the reflective cover;
    a heat dispersing member disposed along the light source between the lamp and the reflective cover, wherein the heat dispersing member overlaps a portion of a surface of the light guide plate which is adjacent to the light input surface, and extends through the opening of the reflective cover and protrudes out of the first receiving space of the reflective cover; and
    a second frame defining a second window at a middle portion thereof, the second frame cooperating with the first frame to form a second receiving space receiving the light source, the light guide plate and the heat dispersing member therein.

2. The backlight module of claim 1, wherein the heat dispersing member is directly attached to the reflective cover.

3. The backlight module of claim 2, wherein the heat dispersing member is strip-shaped, and has a transverse width larger than a corresponding width of the reflective cover.

4. The backlight module of claim 3, wherein the transverse width of the heat dispersing member is equal to or larger than a quarter of a corresponding width of the second frame.

5. The backlight module of claim 1, wherein the first frame has a generally rectangular shape, and comprises four side portions joined end-to-end to cooperatively form a four-sided closed structure, four side walls extend from the side portions, and a plurality of catches are provided at least one of the side walls.

6. The backlight module of claim 5, wherein the second frame comprises two opposite side plates with a plurality of catch holes, each of the catch holes engagingly receiving a respective one of the catches of the first frame.

7. A liquid crystal display device, comprising:
    a liquid crystal panel; and
    a backlight module for illuminating the liquid crystal panel, the backlight module comprising:
        a frame defining a first window at a middle portion thereof;
        a light guide plate comprising a light input surface;
        a light source comprising a lamp and a reflective cover receiving the lamp, the reflective cover defining a first receiving space with an opening facing the light input surface of the light guide plate, the lamp being received in the first receiving space, and light emitted from the lamp transmitted to the light input surface of the light guide plate via the opening of the reflective cover;
        a strip-shaped heat dispersing member positioned adjacent to the light source and corresponding to a length of the lamp, the heat dispersing member disposed between the lamp and the reflective cover, wherein the heat dispersing member overlaps a portion of a surface of the light guide plate which is adjacent to the light input surface, and extends through the opening of the reflective cover and protrudes out of the first receiving space of the reflective cover; and
        a hollow tray with a second window at a middle portion thereof, the hollow tray cooperating with the frame to form a second receiving space accommodating the light source, the light guide plate and the heat dispersing member.

8. The liquid crystal display device of claim 7, wherein the lamp is a cold cathode fluorescent lamp.

9. The liquid crystal display device of claim 8, wherein the heat dispersing member is directly attached to the reflective cover.

10. The liquid crystal display device of claim 9, wherein the heat dispersing member has a transverse width greater than a corresponding width of the reflective cover.

11. The liquid crystal display device of claim 9, wherein the heat dispersing member has a transverse width equal to or greater than a quarter of a corresponding width of the tray.

12. The liquid crystal display device of claim 7, wherein the hollow tray has a generally rectangular shape, and comprises four side portions joined end-to-end to cooperatively form a four-sided closed structure.

13. The backlight module of claim 1, further comprising a reflective sheet received in the second receiving space, wherein one side portion of the reflective sheet is received in the first receiving space of the reflective cover, and the heat dispersing member is disposed between the reflective cover and the reflective sheet.

14. The liquid crystal display device of claim 7, wherein the backlight module further comprises a reflective sheet received in the second receiving space, one side portion of the reflective sheet is received in the first receiving space of the reflective cover, and the heat dispersing member is disposed between the reflective cover and the reflective sheet.

15. A backlight module, comprising:
   a first frame defining a first window at a middle portion thereof;
   a light guide plate comprising a light input surface;
   a light source comprising a lamp and a reflective cover receiving the lamp, the reflective cover comprising a first side, a second side and a third side opposite to the first side, the second side connected between the first side and the third side, the three sides cooperatively defining a receiving space with an opening facing the light input surface of the light guide plate, the lamp being received in the receiving space, and light emitted from the lamp transmitted to the light input surface of the light guide plate via the opening of the reflective cover;
   a heat dispersing member disposed between the lamp and the third side of the reflective cover and overlapping a whole surface of the third side of the reflective cover, and extending through the opening of the reflective cover and protruding out of the receiving space of the reflective cover; and
   a second frame defining a second window at a middle portion thereof, the second frame cooperating with the first frame to form a space receiving the light source, the light guide plate and the heat dispersing member therein.

16. The backlight module of claim 15, wherein the lamp is a cold cathode fluorescent lamp.

17. The backlight module of claim 16, wherein the heat dispersing member is directly attached to the third side of the reflective cover, and has a transverse width larger than a corresponding width of the third side of the reflective cover.

18. The backlight module of claim 15, wherein the heat dispersing member has a transverse width equal to or greater than a quarter of the corresponding width of the second frame.

19. The backlight module of claim 15, wherein the second frame has a generally rectangular shape, and comprises four side portions joined end-to-end to cooperatively form a four-sided closed structure.

20. The backlight module of claim 15, further comprising a reflective sheet received in the receiving space, wherein one side portion of the reflective sheet is received in the reflective cover, and the heat dispersing member is disposed between the reflective cover and the reflective sheet.

* * * * *